United States Patent Office.

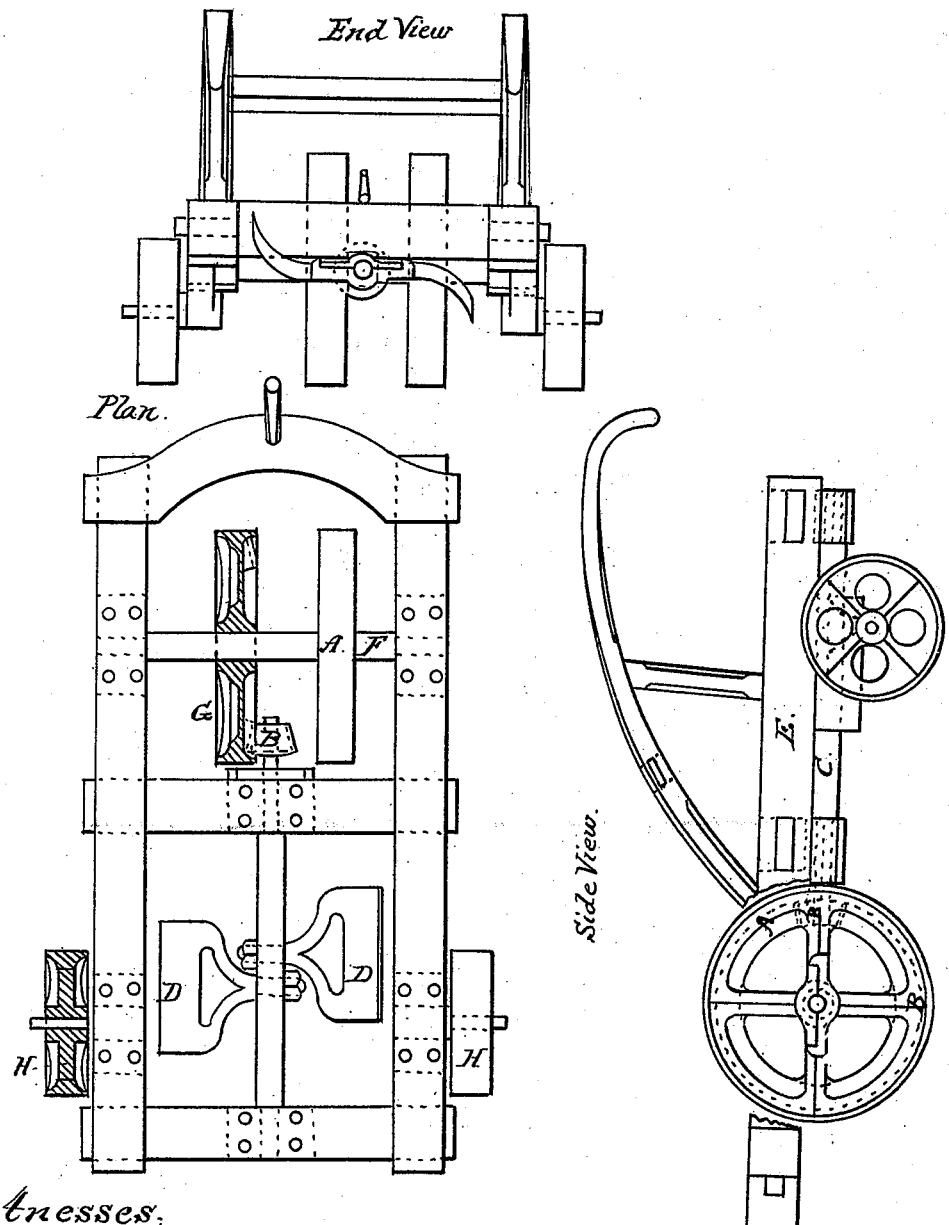

KOSCIUSKO PUCKETT, OF PARISH OF MOREHOUSE, LOUISIANA.

Letters Patent No. 63,176, dated March 26, 1867.

IMPROVEMENT IN COTTON CHOPPER.

*The Schedule referred to in these Letters Patent and making part of the same.*

TO ALL WHOM IT MAY CONCERN:

Be it known that I, KOSCIUSKO PUCKETT, of the parish of Morehouse, in the State of Louisiana, have invented a new and useful Machine for Chopping out young Cotton, so as to leave what remains in bunches, and to flat weed the land; and I do hereby declare that the following is a full, clear, and exact description of the construction and operation of the same, reference being had to the annexed drawings, making a part of this specification, in which the machine is represented as working in a frame two feet wide by three feet long, with cross-pieces, one at each end, one in the middle; the front cross-piece being curved. In front of the middle cross-piece there are two wheels working on the same axle, marked A and G. Wheel A is geared with cogs on the side three inches below the rim (as shown in the side view) of the wheel, and is stationary on the axle. The wheel G, working on the same axle, has no gearing, but is of the same size and shape with wheel A, and is movable either to the right or left, and is for the purpose of supporting the frame, and on which the machine runs. Running from the middle cross-piece to the back cross-piece is a shaft marked C, which rests in boxes on the under side of the machine. On the front end of the shaft is fastened a bevelled pinion marked B, which works in the geared wheel A. In this shaft there is a hoe marked D. Behind and on either side there is a wheel for the purpose of holding the machine on a level, and acting with the two front wheels A and G in conveying the machine over the ground, marked H H. When the machine is in motion the hoe makes a revolution at every foot, cutting out a hoe full of cotton at each revolution.

The driving-wheel A, which is fastened to the axle F, is stationary. G, the balance-wheel, is fastened on the same axle F, and is movable to suit the operator. B is a pinion fastened on the shaft C, to which the hoe D is attached with two nuts, one beneath and one above the shaft, to set the hoe any given depth in the ground. E is the frame underneath which the boxes are let in, and in which the axle F and shaft C work. The wheels H are to hold up the back part of the frame and assist in conveying the frame along.

What I claim, and desire to secure by Letters Patent, is—

The combination of the driving-wheel A, the balance-wheel G, pinion B, shaft C, and hoe D, with the frame E and its appurtenances, when their several parts are arranged and constructed as described for the purpose set forth.

KOSCIUSKO PUCKETT.

Witnesses:
H. DUDLEY COLEMAN,
JAMES BREWER.